Figure 1:
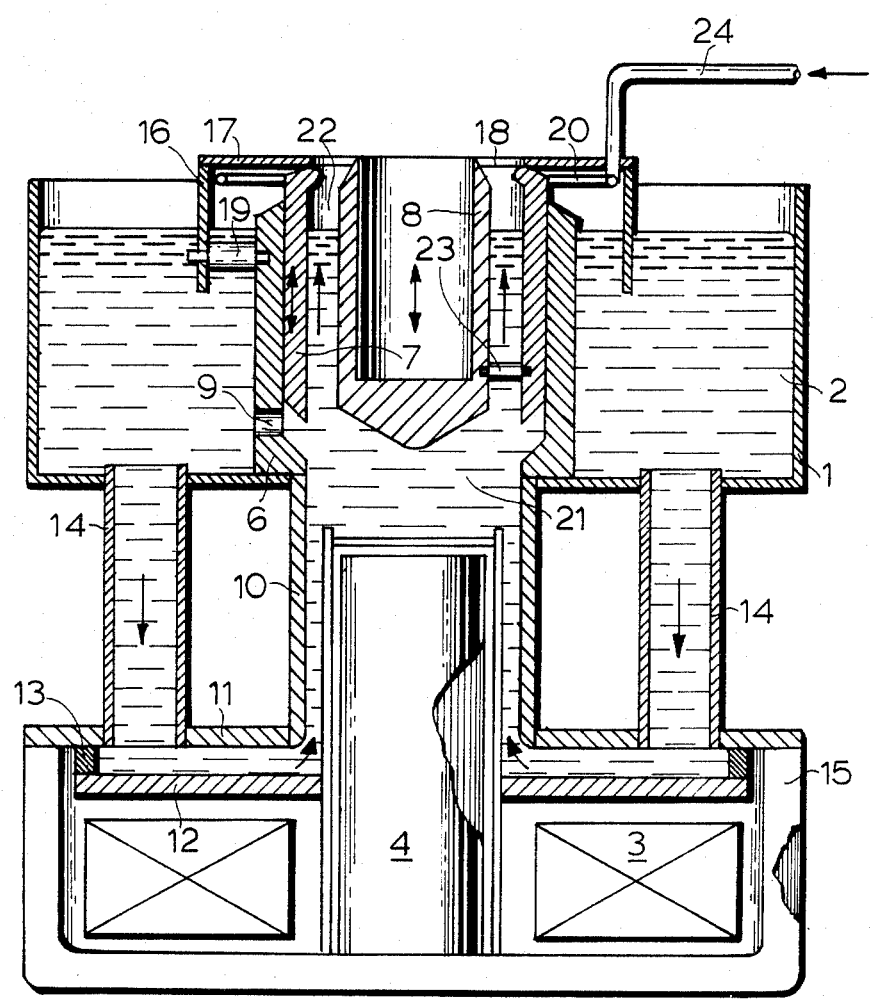

United States Patent [19] [11] Patent Number: 4,523,708
Minchev et al. [45] Date of Patent: Jun. 18, 1985

[54] APPARATUS FOR SOLDERING THE WINDING TO THE COMMUTATOR OF AN ELECTRIC MACHINE

[75] Inventors: Pavel M. Minchev; Hristomir D. Hristov; Stoimen S. Balinov; Mihail H. Angelov; Nikolay V. Yordanov, all of Sofia, Bulgaria

[73] Assignee: Institute Po Metaloznanie I Technologia Na Metalite, Sofia, Bulgaria

[21] Appl. No.: 496,177

[22] Filed: May 19, 1983

[30] Foreign Application Priority Data

Jun. 2, 1982 [BG] Bulgaria ........................... 56866

[51] Int. Cl.³ ............................................. B23K 37/06
[52] U.S. Cl. ........................................ 228/37; 228/39
[58] Field of Search ..................... 228/33, 37, 39, 180, 228/260

[56] References Cited

U.S. PATENT DOCUMENTS

| 767,465 | 8/1904 | Wirth et al. | 228/33 |
| 1,203,465 | 10/1916 | Bell | 228/33 |
| 2,264,703 | 12/1941 | Lenz | 228/39 |
| 3,037,274 | 6/1962 | Hancock | 228/37 X |
| 3,705,457 | 12/1972 | Tardoskegyi | 228/37 |
| 4,433,805 | 2/1984 | Kanno | 228/180 R |

Primary Examiner—Nicholas P. Godici
Assistant Examiner—M. Jordan

[57] ABSTRACT

An apparatus for soldering the wires of the rotor winding of an electric machine to its commutator. The apparatus comprises a tank with molten solder and heaters, a magneto-hydrodynamic pump for the solder, a device for holding the rotor, and a device for the protection of the molten solder from oxidation. The device for holding the rotor comprises a base in the shape of a hollow cylinder with holes and having a chamfered bottom part of the internal surface thereof in which there is movable disposed a replacement nozzle, which is made up of a sleeve and a rotor holding case rigidly connecting together. The nozzle reciprocates in the base. The commutator of the rotor to be solder is inserted into the case. Between the sleeve and the case there is formed a ring-shaped duct, connected with a booster zone which directs the molten solder toward the commutator. To the upper part of the base there is attached a device for the protection of the molten solder from oxidation; such device comprises a hood with a central hole and a gas distributor, connected to a source of inert gas. When there is no rotor inside the case, the nozzle is lifted by the molten solder under the action of the Archimedes' forces, and the molten metal is returned into the bath thereof in the tank through the holes in the base, while the sleeve is sealed against the hood to avoid the flowing out of inert gas provided above the molten solder.

5 Claims, 2 Drawing Figures

APPARATUS FOR SOLDERING THE WINDING TO THE COMMUTATOR OF AN ELECTRIC MACHINE

This invention is related to Minchev et al., U.S. Pat. Nos. 4,331,279 and 4,375,270.

This invention relates to an apparatus for soldering the winding of an electric machine to its commutator; the invention is useful in the production of commutator-type electric motors and generators.

A known apparatus for soldering the winding of an electric machine to its collector is disposed in Bulgarian Pat. No. 31,621 which corresponds to U.S. Pat. No. 4,375,270. Such apparatus comprises a single-phase magneto-hydrodynamic pump with a booster zone and a bath with molten solder and heaters. The magnetic circuit of the single-phase magneto-hydrodynamic pump is enclosed at one end thereof by a winding, and at the other end by the booster zone. The inlet end of the booster zone is connected to the bottom of the solder bath, while its outlet end is connected to a base, which is rigidly fastened to the bottom of the tank containing the bath. This base is a hollow cylinder with a conical bottom and a central hole, in which a nozzle is located concentrically therewith. This nozzle is made up of a sleeve and a case. The upper end of the internal surface of the sleeve is chamfered at an angle smaller than 90 degrees with respect to the axis of the base. The upper end of the external surface of the case is chamfered and parallel to the chamfered end of the internal surface of the sleeve.

A drawback of this known apparatus lies in the necessity of switching-off the single-phase magneto-hydrodynamic pump when the soldered rotor is replaced, because of the danger of filling the case seat with solder. This inevitably results in a certain reduction in the productivity of the apparatus. Moreover, the electro-magnetic system of the single-phase magneto-hydrodynamic pump is of the open type, and this results in an impairment of the energy characteristics of the apparatus and an increase in the consumption of copper and electrotechnical steel. The protection of the molten solder in the bath is achieved by fluxing, but no measures are taken for the protection from oxidation of the flow of molten solder which washes the commutator segments.

It is therefore a general object of the present invention to provide an apparatus for soldering the winding of an electric machine to its commutator, which, in addition to the advantages of the existing apparatus such as that disclosed in the above referred-to patents, provides a total protection of the molten solder from oxidation, and is particularly characterized by an increased productivity and a reduced consumption of copper and electrotechnical steel and electrical energy.

These objects are achieved by an apparatus for soldering the winding of an electric machine to its commutator in accordance with the invention. Such apparatus comprises a single-phase magneto-hydrodynamic pump with a booster zone, a tank containing a bath of molten solder and heaters, and an arrangement into which the rotor to be soldered is positioned. The core of the single-phase magneto-hydrodynamic pump is enclosed at its one end by the winding of the pump, and at its other end by the booster zone. The inlet end of the booster zone is connected to the bottom of the tank containing the solder bath, while its outlet end is attached to a base which is rigidly fastened to the bottom of the tank. The base is a hollow cylinder, and the bottom end of its internal surface is chamfered with respect to its axis at an angle smaller than 90 degrees. Concentrically in the base there is located a nozzle, which is made up of a sleeve and a case, which are rigidly fastened one to another. The sleeve is a hollow cylinder and the upper end of its internal surface is chamfered at an angle smaller than 90 degrees with respect to the axis of the base. The case is a hollow cylinder with a conical bottom, and the upper end of its external surface is chamfered and is parallel to the chamfered upper end of the internal surface of the sleeve.

Above the chamfered part of the base there are disposed uniformly and at equal height a number of holes. The bottom end of the sleeve is chamfered and is parallel to the bottom end part of the internal surface of the base. The sleeve and the base are connected by a loose fit. To the bottom end of the base there is connected the booster zone, which comprises a pipe and a cylindrical vessel. This cylindrical vessel comprises a top disc, a bottom disc, and a side surface. The bottom disc and the top disc are disposed close to one another and have central holes therein, said holes being connected to the core and the one end of the pipe, respectively. The other end of the pipe is connected to the bottom end of the base. The bottom of the bath is connected to the top disc by means of one or more metal conduits. The pipe and the top disc are made of ferro-magnetic material. Concentrically to the winding and the bottom disc there are provided two or more external magentic circuits, such circuits being connected at their one end to the core and at their other end to the top disc. The pipe encloses the core with which it is concentric. To the upper end of the base there is fastened a protective hood. The hood is made up of a cylindrical part and a cover, which is attached tightly to the cylindrical part. The cover has a central hole. The cylindrical part is partially immersed in the molten solder, encloses the base, and is rigidly fastened to the base by means of carriers. Underneath the cover around the central hole there is disposed a gas distributor which is a ring-shaped pipe with holes, such pipe being connected via a reducing valve to a source of inert gas.

The apparatus of the invention has the following main advantages: An increase of labor productivity and the facilitation of the attendance of the apparatus as a result of the elimination of the forced pause in the process cycle during which the soldered rotor is removed from the apparatus and replaced by a rotor to be soldered. This makes the apparatus convenient for robotization; a considerable reduction of the consumption of copper and electrotechnical steel, and of electrical energy as a result of the reduction of the magnetic resistance along the path of the working magnetic flux. The molten solder is protected from oxidation, this resulting in the preservation of its physical and chemical characteristics, and produces a saving of solder and a lengthening of the time of operation of the apparatus without the need for cleaning it.

Figure 2:
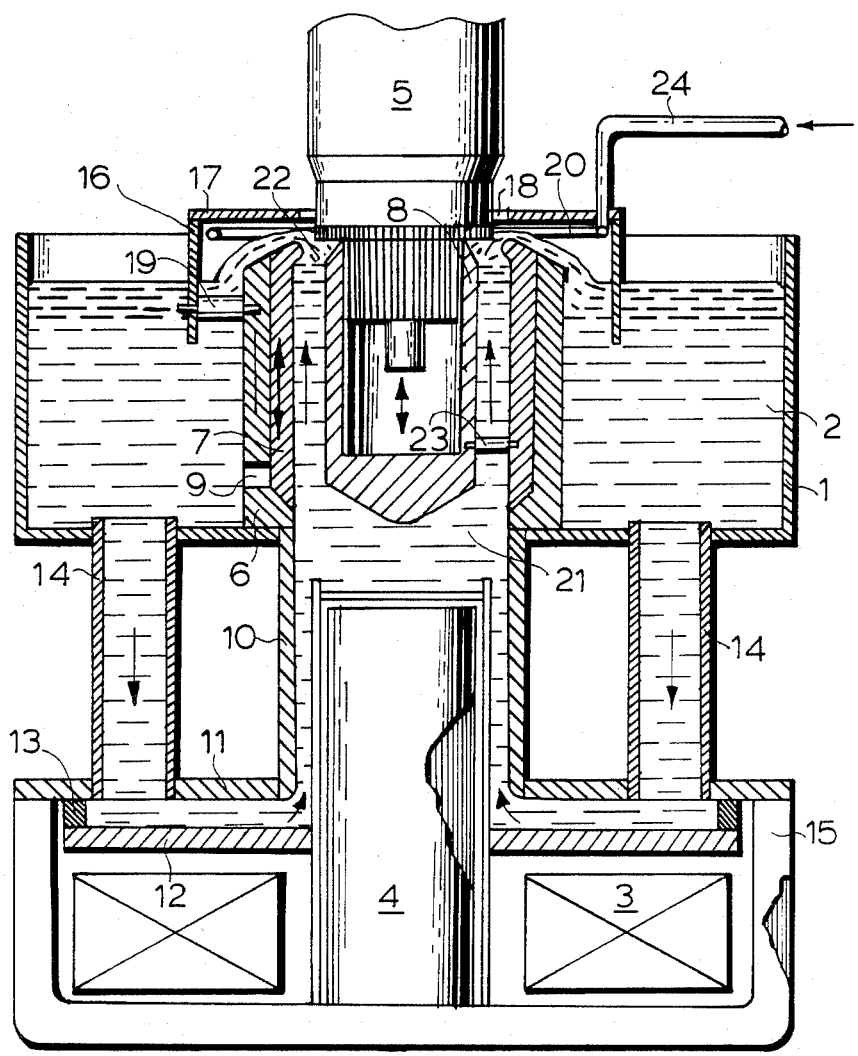

For a better understanding of the invention, reference should be made to the accompanying drawings, in which:

FIG. 1 is a schematic view partially in vertical axial section and partially in elevation of a preferred embodiment of the apparatus with the parts in the position which they occupy when a rotor is not mounted therein, and FIG. 2 is a similar view of the apparatus with the parts thereof in the position which they occupy when a rotor is mounted in such apparatus.

Turning first to FIG. 1, beneath a tank 1 containing molten solder 2 and electrical resistance heaters (not shown) there is disposed a single-phase magneto-hydrodynamic pump for molten metals. Such pump has a winding 3, a central core 4, and a booster zone. To the bottom of the tank 1 there is fastened an arrangement for holding a rotor 5 to be soldered. Such arrangement comprises a base 6 in the form of a central sleeve and an exchangeable nozzle mounted therein. The base 6 is a hollow cylinder, the bottom end of the internal surface of which is chamfered with respect to its axis at an angle smaller than 90 degrees. The nozzle is made up of a sleeve 7 and a case 8, the sleeve and case being rigidly fastened to each other by a number of carriers, of which one is shown at 23. The nozzle reciprocates from an upper position thereof, shown in FIG. 1, to a lower position thereof shown in FIG. 2. The sleeve 7 is a hollow cylinder, the upper end of the internal surface of which is chamfered at an angle smaller than 90 degrees with respect to the axis of the base 6. The case 8 is a hollow cylinder with a conical bottom, the upper end of the external surface of which is chamfered and is parallel to the chamfered upper end of the internal surface of the sleeve 7.

The core 4 is enclosed at its lower end by the winding 3, and at its upper end by the booster zone. Above the chamfered part of the base 6 there are disposed a number of holes 9 (one shown) disposed at the same height. The bottom end of the sleeve 7 is chamfered and is parallel to the bottom conical part of the internal surface of the base 6. The sleeve 7 fits loosely within the base 6. The booster zone is connected to the bottom end of the base 6. The booster zone comprises a pipe 10 and a cylindrical vessel. The cylindrical vessel comprises a top disc 11, a bottom disc 12, and a ring 13 which connects the outer edge portion of disc 12 to the top disc 11, as shown. The discs 11 and 12 are disposed close to one another and have central holes therein, the core 4 extending through the central hole in the bottom disc 12 and being connected to such disc at such location. The lower end of the pipe 10 is connected to the top disc 12 at the central hole therein, and at its top is connected to the bottom of the tank 1 by means of one or more (two shown) vertical metal conduits 14. The pipe 10 and the top disc 11 are made of ferro-magnetic material.

Concentric with the winding 3 and the sleeve member 13 there are disposed two or more external magnetic circuits 15, connected at the bottom to the bottom end of the core 4 and at its upper end to the top disc 11. The pipe 10 is disposed around and is concentric with the core 4.

To the upper part of the base 6 there is fastened a protective hood, which comprises a cylindrical part 16 and a cover 17, the cover being tightly attached to the part 16. The cover 17 has a central hole 18 therein. The cylindrical part 16 is immersed partly in the solder bath 2, encloses the base 6, and is rigidly fastened to it by means of a number of carriers 19 (one shown). Beneath the cover 17 around the central hole 18 there is disposed a gas distributor 20, which is a ring-shaped pipe with holes therein, distributor 20 being connected via a reducing valve (not shown) to a source of inert gas (not shown) by a pipe 24. Between the base 6 and the case 8 there is formed a guiding channel 21. The upper chamfered ends of the sleeve 7 and the case 8 form a ring-shaped duct 22.

The above-described apparatus operates as follows: The initial melting of the solder in the bath 1 is effected by means of the above-described and not shown electric resistance heaters and by induction by the single-phase magneto-hydrodynamic pump. After the melting of the solder, the nozzle composed of the sleeve 7 and the case 8 is lifted into the position thereof shown in FIG. 2 (in accordance with the law of Archimedes) the the sleeve 7 touches the cover 17. Thus a close space is formed, which is limited by the base 6, the surface of the molten solder 2, the protective hood, and the sleeve 7. By means of the gas distributor 20, this space is filled with protective gas (nitrogen, for example) at a suitably low pressure. The molten solder 2, sucked from the bottom of the tank 1, passes through the metal conduits 14, the booster zone, the holes 9, and returns into the bath 1. Access of atmospheric air to the solder is then precluded.

Turning now to FIG. 2, it will be seen that when a rotor 5 to be soldered is placed in the seat therefor in case 8, the nozzle, that is the sleeve 7 and the case 8, moves downwardly under the action of the weight of the rotor, thereby to close the holes 9 in the base 6. The molten solder 2 flows out from the ring-shaped duct 22, simultaneously washing all the segments of the commutator of the rotor, and returns to the tank 1. When the nozzle moves downwardly, the sleeve 7 is separated from the cover 17, and the protective gas begins to pass between the flow of molten solder 2 and the cover 17, thus forming a protective gas pad or enclosure. After the soldering process is terminated, the rotor 5 is lifted out of the case 8, thus restoring the nozzle to the position thereof shown in FIG. 1, and ending the working cycle of the apparatus.

In cases when it is necessary to solder a rotor 5 with the diameter of the commutator thereof differing from that of the preceding rotor, the nozzle, that is the sleeve 7 and the case 8, is replaced by a new nozzle with a suitable diameter of seat in the case 8 thereof. Then the afore-described working cycle of the apparatus is repeated.

Although the invention is described and illustrated with reference to a single preferred embodiment thereof, it is to be expressly understood that it is in no way limited to the disclosure of such preferred embodiment but is capable of numerous modifications within the scope of the appended claims.

We claim:

1. Apparatus for soldering the wires of the rotor winding of an electric machine to its commutator, comprising a tank for holding a supply of molten solder, means for holding a rotor, a pump for delivering molten solder from the tank to the zone wherein the wires from the rotor winding are connected to the segments of the commutator, means for preventing the delivery of molten solder to the connection of the segments of the commutator unless a rotor is disposed within and supported by the means for holding a rotor in the apparatus, and means for the protection of the molten solder from oxidation, the means for the protection of the molten solder from oxidation comprising a hood which closes off the tank from the atmosphere when there is no rotor positioned in the rotor holding means, said hood then forming a closed space at the top of the tank, means for supplying said closed space with an oxidation-preventing gas, and means for opening said closed space and leading gas therefrom to the zone wherein the wires from the rotor winding are connected to the segments of the commutator when a rotor is positioned in and supported by the means for holding a rotor.

2. In an apparatus for soldering the wires of the rotor winding of an electric machine to its commutator, said apparatus having a tank for holding a supply of molten solder, means for holding the rotor, and a pump for delivering molten solder from the solder holding means to the zone wherein the wires from the rotor winding are connected to the segments of the commutator, the improvement which comprises means for the protection of the molten solder fron oxidation, the means for holding the rotor comprising a base in the form of a hollow cylinder with at least one hole, which when open returns the molten solder back into the molten solder containing tank, a replaceable nozzle movably disposed within the base, said nozzle being made up of a sleeve and a rotor-holding case rigidly connected together, between the sleeve and the case there being formed a ring-shaped duct which directs the molten solder toward the commutator, the means for the protection of the molten solder from oxidation being attached to the upper part of the base and comprising a hood with a central hole and a gas distributor connected to a source of inert gas, when there is no rotor inside the case the nozzle being lifted by the molten solder in the tank under the action of the Archimedes' forces, the hole in the base is not then covered by the sleeve, the molten metal then being returned back into the molten solder containing tank through the hole in the base, and the sleeve is then sealed against the hood to avoid the flowing out of the inert gas provided above the molten solder, and when a rotor is positioned in the case the nozzle descends so that the sleeve covers said hole in the base.

3. An apparatus according to claim 2, wherein the pump is a single-phase magneto-hydrodynamic pump provided with a booster zone, the booster zone is disposed at the bottom end of the base, the booster zone comprising a vertical pipe and a cylindrical vessel comprising a top disc, a bottom disc, the two discs being disposed concentric and parallel to each other, and a side sleeve which connects the outer zones of the discs together, the pump having a central vertically disposed core, the bottom disc being connected to the core at the central hole through such disc, the vertical pipe surrounding the upper end of the core and providing an annular passage between it and the core for leading the molten solder to the booster zone, the top disc being contained to the pipe at the central hole through such disc and at least one metal conduit extending vertically downward from the bottom of the tank to the top disc.

4. An apparatus according to claim 3, wherein the vertical pipe and the top disc are made of ferro-magnetic material, and concentric with the winding of the pump and the sleeve connecting the outer portions of the top and bottom discs there are disposed at least two external magnetic circuits connected at one end to the bottom end of the core and at their upper end to the top disc.

5. An apparatus in accordance with claim 2, wherein to the upper part of the base there is fastened a protective hood made up of a cylindrical part and a cover attached tightly to the cylindrical part, the cover being provided with a central hole, while the cylindrical part of the protective hood is partially immersed into the solder in the tank and encloses the base, the cylindrical part being rigidly connected to the base, and comprising a gas distributor made in the form of a ring-shaped pipe with holes, the distributor being adapted to be connected via a reducing valve to a compressed source of inert gas.

* * * * *